(12) United States Patent
Bucknell

(10) Patent No.: US 10,662,989 B2
(45) Date of Patent: May 26, 2020

(54) HIGH-CAPACITY RADIAL FIT COUPLING BOLTS

(71) Applicant: Technofast Industries Pty Ltd., Richlands, Queensland (AU)

(72) Inventor: John Wentworth Bucknell, Indooroopilly (AU)

(73) Assignee: TECHNOFAST INDUSTRIES PTY LTD, Richlands, Queensland (AU)

( * ) Notice: Subject to any disclaimer, the term of this patent is extended or adjusted under 35 U.S.C. 154(b) by 165 days.

(21) Appl. No.: 15/845,606

(22) Filed: Dec. 18, 2017

(65) Prior Publication Data

US 2018/0106281 A1 Apr. 19, 2018

Related U.S. Application Data

(63) Continuation of application No. 14/382,634, filed as application No. PCT/AU2013/000209 on Mar. 6, 2013, now Pat. No. 9,879,706.

(30) Foreign Application Priority Data

Mar. 6, 2012 (AU) ................................ 2012900875

(51) Int. Cl.
*F16B 4/00* (2006.01)
*F16B 7/02* (2006.01)
(Continued)

(52) U.S. Cl.
CPC ................ *F16B 2/14* (2013.01); *F16B 4/004* (2013.01); *F16B 7/02* (2013.01); *F16B 7/0406* (2013.01);
(Continued)

(58) Field of Classification Search
CPC .... F16B 2/04; F16B 2/14; F16B 4/004; F16B 7/02; F16B 7/0406; F16B 7/0426;
(Continued)

(56) References Cited

U.S. PATENT DOCUMENTS 1,596,856 A * 8/1926 Setlow ...................... F16B 3/06
411/75
3,643,765 A 2/1972 Hanchen
(Continued)

FOREIGN PATENT DOCUMENTS

DE 102009022334 A1 12/2010
GB 2 224 099 A 4/1990
(Continued)

OTHER PUBLICATIONS

Supplementary European Search Report issued for corresponding European Patent Application No. 13757743, dated Sep. 17, 2015, 5 pages.
(Continued)

*Primary Examiner* — Josh Skroupa
(74) *Attorney, Agent, or Firm* — Duane Morris LLP

(57) ABSTRACT

A high capacity radial-fit coupling bolt (or "expanding sleeve bolt") has a pair of tapered sleeves about a shank of a bolt to which can be applied a tensioning load. An extrudable ring, or a compression ring, is interposed between a head nut or head flange at one end of the shank, and one end of an inner sleeve. A tensioning load is applied to the shank, the inner sleeve causing the outer sleeve to expand diametrically. At a preset load limit, the extrudable ring is extruded through at least one bore in a drive piston between the head nut and the extrudable ring, to allow shank to move relative to the inner sleeve until the tensioning load is fully applied. Alternatively, a drive member is provided between the head nut or head flange and the compression ring, and at a preset limit, the compression ring allows the shank to move relative to inner sleeve until the tensioning load is fully applied. The preset limit will typically correspond to the force required to fully expand the outer sleeve.

18 Claims, 4 Drawing Sheets

(51) Int. Cl.
 *F16B 29/00* (2006.01)
 *F16B 2/14* (2006.01)
 *F16L 23/036* (2006.01)
 *F16B 31/04* (2006.01)
 *F16B 7/04* (2006.01)

(52) U.S. Cl.
 CPC ............ *F16B 29/00* (2013.01); *F16B 31/043* (2013.01); *F16L 23/036* (2013.01); *F16B 2200/506* (2018.08); *Y10T 403/4924* (2015.01); *Y10T 403/4958* (2015.01)

(58) Field of Classification Search
 CPC .. F16B 29/00; F16B 31/043; F16B 2200/506; F16B 2200/509; F16L 23/036; Y10T 403/4924; Y10T 403/4958; Y10T 403/4966; Y10T 403/645; Y10T 403/648
 USPC .......................... 403/277, 281, 282, 337, 338
 See application file for complete search history.

(56) References Cited

U.S. PATENT DOCUMENTS

| | | |
|---|---|---|
| 4,304,502 A | 12/1981 | Stratienko |
| 4,685,188 A | 8/1987 | Goy |
| 4,743,138 A | 5/1988 | Goy |
| 5,067,847 A | 11/1991 | Muellenberg |
| 5,170,551 A | 12/1992 | Norberg |
| 6,039,497 A | 3/2000 | Gullberg |
| 7,309,187 B2 * | 12/2007 | Swanson .................. F16D 1/094 403/367 |
| 8,177,017 B2 | 5/2012 | Asam |
| 2009/0258715 A1 | 10/2009 | Rode et al. |
| 2010/0226715 A1 * | 9/2010 | Schneider .................. F16B 3/06 403/350 |

FOREIGN PATENT DOCUMENTS

| | | |
|---|---|---|
| JP | 2007-524049 A | 8/2007 |
| WO | 88/02074 A1 | 3/1988 |
| WO | 2005080837 A1 | 9/2005 |

OTHER PUBLICATIONS

International Search Report for corresponding PCT Application No. PCT/AU2013/000209, dated Apr. 12, 2013, 3 pages.

\* cited by examiner

HIGH-CAPACITY RADIAL FIT COUPLING BOLTS

CROSS-REFERENCE TO RELATED PATENT APPLICATIONS

The present application is a continuation of U.S. patent application Ser. No. 14/382,634, filed Sep. 3, 2014, which is a U.S. national stage application under 35 U.S.C. § 371 of PCT Application No. PCT/AU2013/000209, filed Mar. 6, 2013, which claims priority to Australian patent application no. 2012900875, filed Mar. 6, 2012, the entireties of which are incorporated herein by reference.

BACKGROUND OF THE INVENTION

1. Field of the Invention

This invention relates to high-capacity radial fit coupling bolts. (Such bolts are also known as "expanding sleeve bolts".)

The invention particularly relates, but is not limited to, high-capacity radial fit coupling bolts used to secure engineering components securely together. Examples of potential uses for the bolts include connecting pipeline flanges, drive couplings, machinery mountings and the like.

2. Prior Art

NB: The following discussion is by way of background information only, and is not to be considered a statement of the common general knowledge (CGK) in the area of technology.

When establishing the specifications of drive couplings for power transmission shafts, engineers calculate the size of the bolts needed by formulae which consider factors such as: (a) coupling diameter, (b) power throughput and (c) materials used to predict bolt size, frequency and tensile load requirements. Power transmission is ideally made via the frictional grip between opposing coupling faces, but will usually also consider the resistance to shear forces which may be directed against the bolts' shanks during operation. Where the shear forces may occur as a result of vibration, slippage and/or lack of bolt tension, the impingement of coupling bolt holes against their respective bolt shanks often damages and distorts these components, making disassembly extremely difficult. It can be seen that the application and maintenance of the specified bolt tension in all the bolts is vital in maintaining the efficacy of the drive couplings. It can also be seen that a bolt which can expand radially to fill any void formed by the tolerance between bolt shank and its respective bolt holes in the drive coupling will substantially assist limiting any slippage of the coupling faces.

For some years it has been common practice to employ bolts which have this capacity. In currently used types, which are commonly referred to as "Radial Fit Coupling Bolts", the bolt component is manufactured having an enlarged, tapered portion at the midsection of the shank with screw-threaded portions at each end. The tapered section of the bolt is received within a complementary-shaped tapered sleeve which, when placed in position through aligned bolt holes in the drive coupling components to be clamped, is diametrically expanded by the action of drawing the tapered portion of the shank into the tapered sleeve. This diametrical expansion will continue in response to the applied force until the sleeve completely fills the bolt holes through the coupling components.

Typically in such a bolt, the external tapered surface of the central portion of the shank and the inner surface of the sleeve must be manufactured to a very fine finish, and may require the surfaces to be polished. In addition, a 'track" may be machined in the tapered surface of the central portion of the shank. The inner taper may become locked inside the external sleeve and difficult to remove, requiring the injection of oil under pressure to eject the bolt and to allow the sleeve to collapse; and as the sleeve is diametrically expanded, the portions overlying the "track" do not expand to the same extent. When the components secured by the bolt are to be released, the sleeve may jam about the central portion of the shank and remain in relatively high frictional engagement with the aligned bolt holes in the components, requiring considerable force e.g. applied by a press, to release the bolt from the bolt holes.

The manufacturers of these known bolts recommend that a back nut be fitted to the screw-threaded portion at one end of the bolt shank (to engage one of the coupling components); a tensioning load applied to the other end of the bolt shank; and, when the desired expansion of the sleeve is achieved, the tensioned other end of the shank may then be locked in place by tightening down a nut on that end, the nut engaging the second of the coupling components.

Such designs exhibit a clear disadvantage in that the original "setting" of the sleeve will lock the bolt in place via sticking friction. Thus, when the bolt is tensioned with the back nut in place, very little of the applied tensile load will migrate past the tapered section of the shank to tension the opposite end thereof and lock the back nut. This may be redressed by tightening the shank from that end also, but will have the effect of decreasing the "setting" force which occasions the diametrical expansion of the sleeve.

OBJECT OF THE INVENTION

It is an object of the present invention to provide a design for a high-capacity radial fit coupling bolt, or high-capacity expanding sleeve bolt, which overcomes, or at least ameliorates, the problems of the prior art.

Other preferred objects of the present invention will become apparent from the following description.

SUMMARY OF THE INVENTION

In one aspect, the present invention resides in a high-capacity radial fit coupling bolt assembly, or high-capacity expanding sleeve bolt assembly, to secure at least two components together, the assembly including:

a shank having a substantially cylindrical central portion intermediate first and second end portions;

respective inner and outer sleeves surrounding at least a section of the central portion of the shank, the inner and outer sleeves having complimentary respective outer and inner tapered engagement faces; and an extrusion ring interposed between a first end of the inner sleeve and a drive piston at or adjacent the first end portion of the shank, the drive piston having at least one axial bore open to the extrusion ring;

so arranged that, as a tensioning load is increasingly applied to the second end portion of the shank, relative axial movement between the inner and outer sleeves will cause the outer sleeve to expand diametrically into engagement with the at least two components up to a preset limit, at which the extrusion ring will at least be partially extruded through the at least one axial bore, thereby allowing the shank to move relative to the inner and outer sleeves and at least two components.

In a second aspect, the present invention resides in a high-capacity radial fit coupling bolt assembly, or high-capacity expanding sleeve bolt assembly, to secure at least two components together, the assembly including:

a shank having a substantially cylindrical central portion intermediate first and second end portions;

respective inner and outer sleeves surrounding at least a section of the central portion of the shank, the inner and outer sleeves having complimentary respective outer and inner tapered engagement faces; and a compression ring interposed between a first end of the inner sleeve and a drive member at or adjacent the first end portion of the shank;

so arranged that, as a tensioning load is increasingly applied to the second end portion of the shank, relative axial movement between the inner and outer sleeves will cause the outer sleeve to expand diametrically into engagement with the at least two components up to a preset limit, at which the compression ring will allow the shank to move relative to the inner and outer sleeves and to the at least two components.

Preferably, as the tensioning load is initially applied to the second end of the shank, the compression ring will axially move the inner sleeve relative to the outer sleeve to expand the outer sleeve diametrically, while allowing the shank to move relative to the inner sleeve and thereby allow the tensioning load to be applied along the full length of the shank.

Preferably, the first end portion is formed with an integral head flange; or is screw-threaded to receive a head nut; the head flange or head nut being engageable with an abutment face on an end of one of the components.

Preferably, the head flange or head nut has an annular ring portion which extends into a first annular cavity, defined by a bolt hole in the one component and the first end portion of the shank, to engage an outer annular face of the head member, the inner face of the head member engaging the first end of the inner sleeve.

Preferably, the second end portion of the shank is screw-threaded, or otherwise profiled, to be releasably engaged by a tensioning apparatus, where the tensioning apparatus, or a tensioning nut on the second end portion, is engageable with an outer annular end face of the outer sleeve.

Preferably, the outer sleeve has a peripheral flange, forming the annular outer face, with an annular inner face engaging the second of the components.

Preferably, the inner sleeve has a body with a cylindrical bore for slidable movement on the central portion of the shank. Preferably, a peripheral flange at a first end of the body is slidably received within a bolt hole in the first of the components and provides an annular abutment face at the one end engaged by the extrusion ring.

Preferably, the outer tapered engagement face of the inner sleeve, and the inner tapered engagement face of the outer sleeve, is inclined at a relatively shallow angle to the longitudinal axis of the bolt assembly. Preferably, the angle of inclination is less than 10°, more preferably less than 7.5°; most preferably in the range of 0.5°-5°.

Preferably, the inner and outer sleeves will be manufactured from metals or alloys, with at least the outer sleeve having a relatively thin wall thickness, to enable the outer sleeve to expand diametrically sufficiently to fill the working clearance between the outer sleeve and the set of aligned bolt holes (in the at least two components), enabling the bolt assembly to be inserted therein before tensioning. Typically the working clearance will not exceed 0.5 mm, more preferably 0.3 mm.

Preferably, grease, graphite, or other suitable lubricant, is applied to at least one of the tapered engagement faces before the bolt assembly is assembled, to assist the relative axial movement between the inner and outer sleeves as the bolt assembly is both tensioned and released.

Preferably, the shank, the drive piston, and the head and tail nuts will be manufactured from high-tensile steel.

Preferably, the outer sleeve has a body with a cylindrical outer face slidably received in a bolt hole of a second of the components.

Preferably, the drive piston has a plurality of equally-spaced axial bores therethrough.

Preferably, the extrusion ring is manufactured from a "flowable" material. Suitable materials includes rubbers (natural and/or synthetic); polymers, including Nylon (Trade Mark), polyethylene, polypropylene or the like; "soft" metals, such as lead, tin or aluminium or alloys thereof; "harder" metals, such as bronze; or other suitable "flowable" material(s).

In a third aspect, the present invention resides in a method of securing at least two components together, the components having at least one set of aligned bolt-holes, including the steps of:

(a) inserting a high-capacity radial fit coupling bolt assembly, having the extrudable ring, into one set of the aligned bolt holes, with the head flange or head nut having an inner face optionally spaced a small distance from an end face of a first of the components (and, optionally, an annular end portion on the head flange or head nut received in the bolt hole of the first component);

(b) applying a tensioning load to the second end portion of the shank to axially draw the inner sleeve into the outer sleeve; wherein:

(c) the engagement between the outer tapered engagement face on the inner sleeve with the inner tapered engagement face of the outer sleeves causes the cylindrical outer face of the outer sleeve to expand diametrically into engagement with the one set of bolt holes in the components; and (d) as the tensioning load further is increased above a preset limit, the extrusion ring will at least be partially-extruded through the at least one axial bore in the drive piston to allow the shank to move relative to the inner sleeve (and thereby the components) until the head flange or head nut is engaged with the first of the components and the desired tensioning load has been applied to the shank to secure the at least two components together.

In a fourth aspect, the present invention resides in a method of securing at least two components together, the components having at least one set of aligned bolt-holes, including the steps of:

(a) inserting a high-capacity radial fit coupling bolt assembly, having the compression ring, into one set of the aligned bolt holes, with the head flange or head nut having an inner face optionally spaced a small distance from an end face of a first of the components (and, optionally, an annular end portion on the head flange or head nut received in the bolt hole of the first component);

(b) applying a tensioning load to the second end portion of the shank to axially draw the inner sleeve into the outer sleeve; wherein:

(c) the engagement between the outer tapered engagement face on the inner sleeve with the inner tapered engagement face of the outer sleeves causes the cylindrical outer face of the outer sleeve to expand diametrically into engagement with the one set of bolt holes in the components; and (d) as the tensioning load is further increased above a preset limit, the compression ring will allow the shank to move relative to the inner and outer sleeves and to the at least components.

Preferably, during step (b), the compression ring will move the inner sleeve relative to the outer sleeve to expand the outer sleeve diametrically, while allowing the shank to move relative to the inner sleeve and thereby allow the tensioning load to be applied along the full length of the shank to secure the at least two components together.

Preferably, after step (d), in a further step (e), a tensioning nut is engaged with screw-threads on the second end portion of the shank and is rotatably moved there-along into tensioned engagement with a second of the components, before release of the tensioning apparatus from the second end portion of the shank. (In this embodiment, the tensioning nut is received on the second end portion of the shank inwardly of the connection between the second end portion of the shank and the tensioning apparatus.)

Alternatively, after step (d), in a further step (e), a hydraulic nut, which operates as the tensioning apparatus, and which engages the second of the components, is operated normally, by engaging its locking device and releasing the charge pressure.

BRIEF DESCRIPTION OF THE DRAWINGS

To enable the invention to be fully understood, and to enable the skilled addressee to put the invention into practice, a number of preferred embodiments will now be described, with reference to the accompanying illustrations, in which.

DETAILED DESCRIPTION OF THE PREFERRED EMBODIMENTS

The skilled addressee will appreciate that the embodiments of the present invention to be hereinafter described are designed for applications where the shear loads on the bolt shanks may be extreme. The coupling bolts of the present invention may be used in drive couplings or other devices for transmitting extremely high rotational loads; but are also suitable for installations such as the mounting bolts for large machines (such as marine liquid- or gas-fuelled engines), pillars or beams for buildings, or the like.

Figure 1:
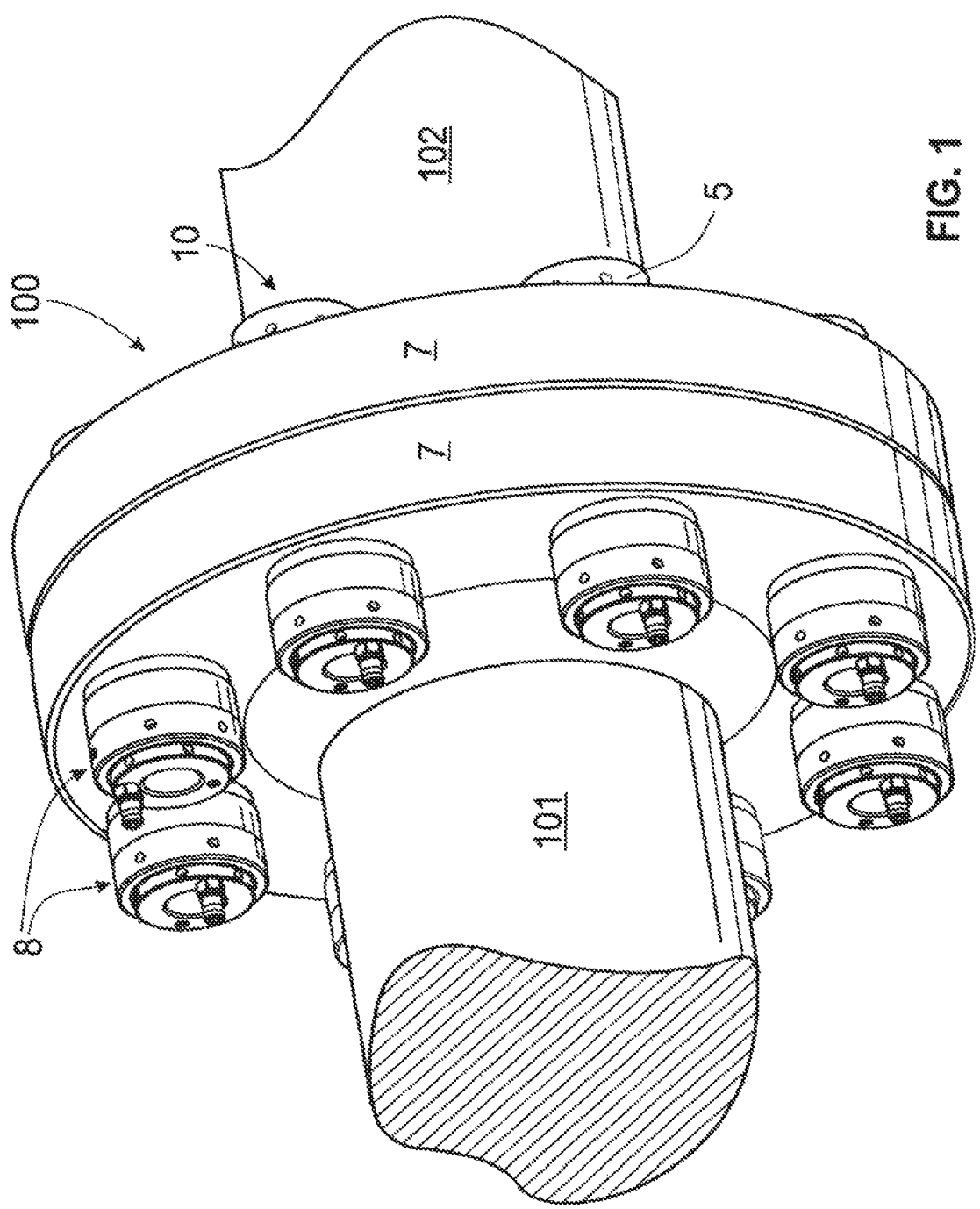
FIG. 1 is an isometric view of a coupling assembly between the flanges of two drive shafts employing a plurality of hydraulic nuts fitted to respective coupling bolts of a first embodiment of the present invention.
Figure 2:
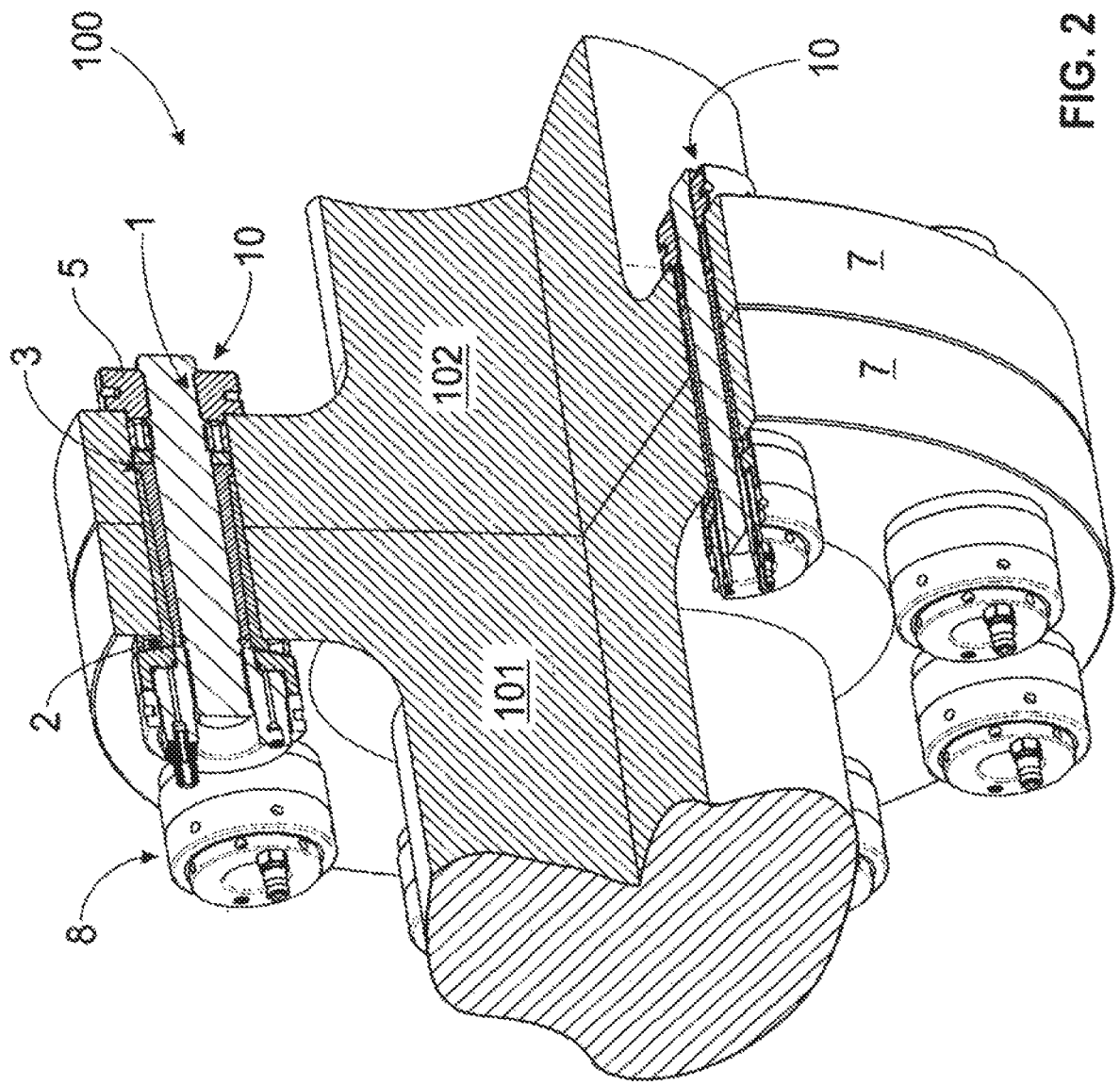
FIG. 2 is a part-sectional isometric view of the coupling assembly.
Figure 3:
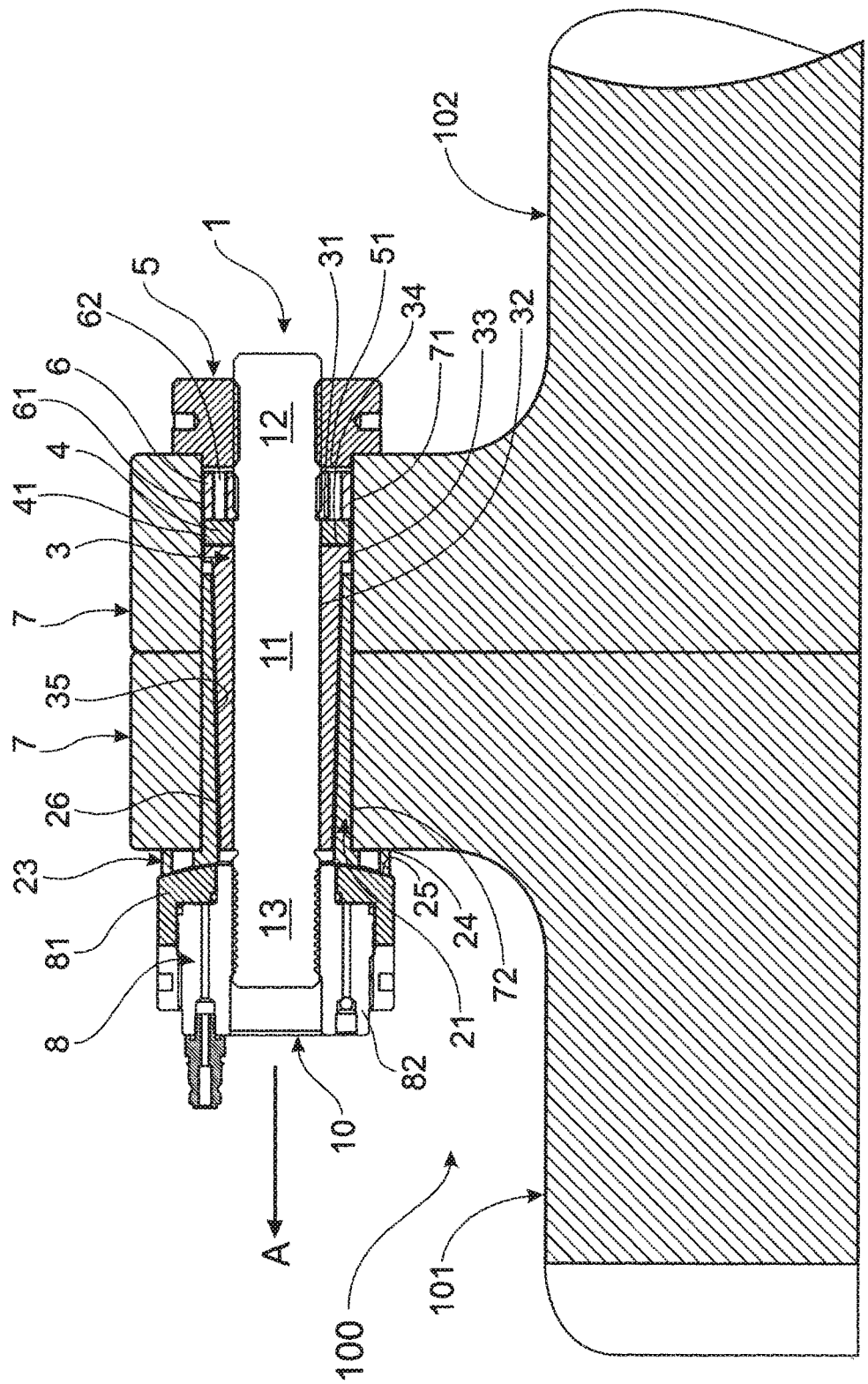
FIG. 3 is a sectional side elevation view of the coupling assembly, with the coupling bolt of the first embodiment prior to the application of the tensioning load to the bolt shank.

Referring to FIGS. 1 to 3, a drive coupling assembly 100 interconnects the respective flanges 7 of a pair of respective drive shafts 101, 102.

As will be hereinafter described in more detail, the coupling assembly 100 incorporates a plurality of coupling bolts 10, in accordance with a first preferred embodiment of the present invention, provided at equal angular spacing's around the flanges 7, where the coupling bolts 10 are tensioned by respective hydraulic nuts 8.

FIG. 3 illustrates a first embodiment of the present invention, where each high-capacity radial fit coupling bolt (or expanded sleeve bolt) 10, is provided with a hydraulic nut 8, e.g., of the type manufactured and sold by Technofast Industries Pty Ltd, 2/677 Boundary Road, Richlands, Queensland, Australia, under the Registered Trade Mark "Technofast".

The coupling bolt 10 has a shank 1 with a cylindrical central portion 11 intermediate screw-threaded first and second end portions 12, 13.

A head nut 5 is screw-threadably engaged with the first end portion 12 of the shank 1 and has an annular end portion 51 on its inner face. The skilled addressee will note that the annular end portion 51 on the head nut 5 is received within a cavity defined by the bolt hole 71 of the first of the components 7 and the shank 1.

An inner sleeve 3 has a tubular body 31 with a cylindrical bore 32 for slidable movement on the central portion 11 of the shank 1. At the end of the body 31 adjacent the first end portion 12 of the shank 1, a peripheral flange 33 is slidably received in the bolt hole 71 in the first component 7 and has an annular abutment face 34 at its outer end.

The body 31 of the inner sleeve 3 has an outer tapered engagement face 35 where the angle of inclination of that face to the longitudinal axis of the shank 1 is in the range of 3°-5°.

The outer sleeve 2 has a tubular body 21 with a cylindrical outer face 22 which has a working clearance of 0.3 mm-0.5 mm with the boltholes 71, 72 of the first and second components before the bolt assembly 10 is tensioned. At the end of the body 21 adjacent the second end portion 13 of the shank 1, a peripheral flange 23 has an inner annular abutment face 24 is engageable with an adjacent face of the second component 7, and an outer abutment face 25 on the body 21 of the outer sleeve 2 is engageable by an outer portion 81 of the hydraulic nut 8, the inner portion 82 of the hydraulic nut 8 being screw-threadably engaged with the second end portion 13 of the shank 1.

The body 21 of the outer sleeve 2 has an inner tapered engagement face 26 inclined at the same angle to the shank 1 as the outer tapered engagement face 35 of the inner sleeve 3.

A driving piston 6 has an annular body 61 with a plurality of equally-spaced axial bores 62 extending therethrough. The annular body 61 is screw-threadably mounted on the first end portion 12 of the shank adjacent the end of the central portion 11.

An extrusion ring 4, having a tubular body 41, is interposed between the annular abutment face 34 on the inner sleeve 3 and inner annular abutment face 63 of the driving piston 6. The inner bore of the body 41 is slidably engaged with the central portion 12 of the shank 1; and the outer face is aligned with the outer face 22 of the outer sleeve 2.

The bolt assembly 10 is assembled and inserted in the aligned bolt holes 71, 72 as shown in FIG. 3.

The skilled addressee will note that the inner face of the head nut 5 is spaced from the adjacent face of the first component 7 and that the peripheral flange 33 on the inner sleeve 3 is spaced from the adjacent (inner) end of the body 21 of the outer sleeve.

As the hydraulic nut 8 is charged, the inner portion 82 of the hydraulic nut 8 will move in the direction of arrow A, causing the annular end portion 51 on the head nut 5 to engage the driving piston 6 and urge the driving piston 6, extrusion ring 4 and inner sleeve 3 towards the outer sleeve 2. The sliding engagement between the respective outer tapered engagement face 34 of the inner sleeve 2 with the inner tapered engagement face 26 of the outer sleeve 2, thereby diametrically expanding the outer sleeve 2 into engagement with the aligned bolt holes 71, 72 in the components 7.

When the desired tensioning load has been applied to the shank 1 by the hydraulic nut 8, the hydraulic nut 8 may be isolated from the source of the hydraulic fluid under pressure to lock the hydraulic nut 8 under tensile load.

At a preset tensioning load, the "flowable" material of the body 41 of the extrusion ring 4 will commence to flow through the axial bores 62 in the body 61 of the driving piston 6. This will limit any further relative movement between the inner and outer sleeves 3, 2; but will allow the driving piston 6, and head nut 5, to continue to move in the direction of arrow A until the inner face of the head nut 5 engages the adjacent face of the first component 1 and the desired tensioning load is applied along the length of the shank 1.

If the coupling components 7 are to be separated, e.g., for maintenance, the hydraulic pressure in the hydraulic nut 8 is released, allowing the shank 1 to be moved in a direction opposite to arrow A to relieve the tensioning load on the bolt assembly 10. The inner sleeve 3 will tend to move in the direction opposite to arrow A, reducing the diametrically-applied forces on the outer sleeve 2. The head nut 5 is released from the first end portion 12, of the shank 1, enabling the first end portion 12 of the shank 1 to be pressed in the direction of arrow A, to release the bolt assembly 10 from the components 7.

In a second embodiment, not illustrated, a tensioning (or tail) nut may be interposed between the tensioning apparatus (connected to the second end portion 13 of the shank 1) and the outer sleeve 2. In this embodiment, the tensioning apparatus applies a tensioning load to the shank 1 to cause the inner sleeve 3 to be axially moved along the central portion 11 of the shank 1 to diametrically expand the outer sleeve 2 as hereinbefore described.

When the desired tensioning load has been applied, the tensioning (or tail) nut is rotated to move along the second end portion 13 in a direction opposite to the direction of arrow A, until it engages the outer abutment face 26 of the outer sleeve 2 to maintain the tensioning load on the shank 1. The tensioning apparatus, e.g., a hydraulic jack, can then be removed.

In this embodiment, to enable the components 7 to be separated, the tensioning apparatus is reconnected to the second end portion 13 of the shank 1 and a tensioning load is applied to the shank 1 to enable the tensioning (or tail) nut to be rotatably released from its engagement with the outer sleeve 2; and the tensioning apparatus is released from the second end portion 13 of the shank 1. The head nut 5 is released from the first end portion 12 to enable the bolt assembly 10 to be withdrawn as hereinbefore described.

It will be readily apparent to the skilled addressee that the coupling bolt 10 as hereinbefore described can provide considerable clamping forces between the opposed faces of the components 7 which are in frictional engagement, and can withstand and oppose even extreme shear forces opposing the relative rotation of the components 7.

The selection of the materials and/or dimensions for the extrusion ring 6, the outer sleeve 2 and the inner sleeve 3 will depend on the intended applications for the bolt assembly 10. Preferably, the outer sleeve 2 will have a relatively thin wall, of metal or metal alloy, to enable the diametrical expansion of the outer sleeve 2 when the inner sleeve 3 is forced therein as the shank 1 is tensioned.

The materials for the manufacture of the extrusion ring 4 may be selected from a wide range of polymer/plastics material; or metal/metal alloys; or the like. As hereinbefore described, the materials may range from Nylon, through lead, aluminium, to bronze, depending on the preset limit of the tensioning load at which the body 41 of the extrusion ring 4 commences "flowing" through the axial bores 62 in the body 61 of the driving piston 6, to thereby allow the shank 1 to continue to move relative to the components 7 until the desired tensioning load is applied to the shank 1, that load being evenly distributed along the shank 1.

Figure 4:
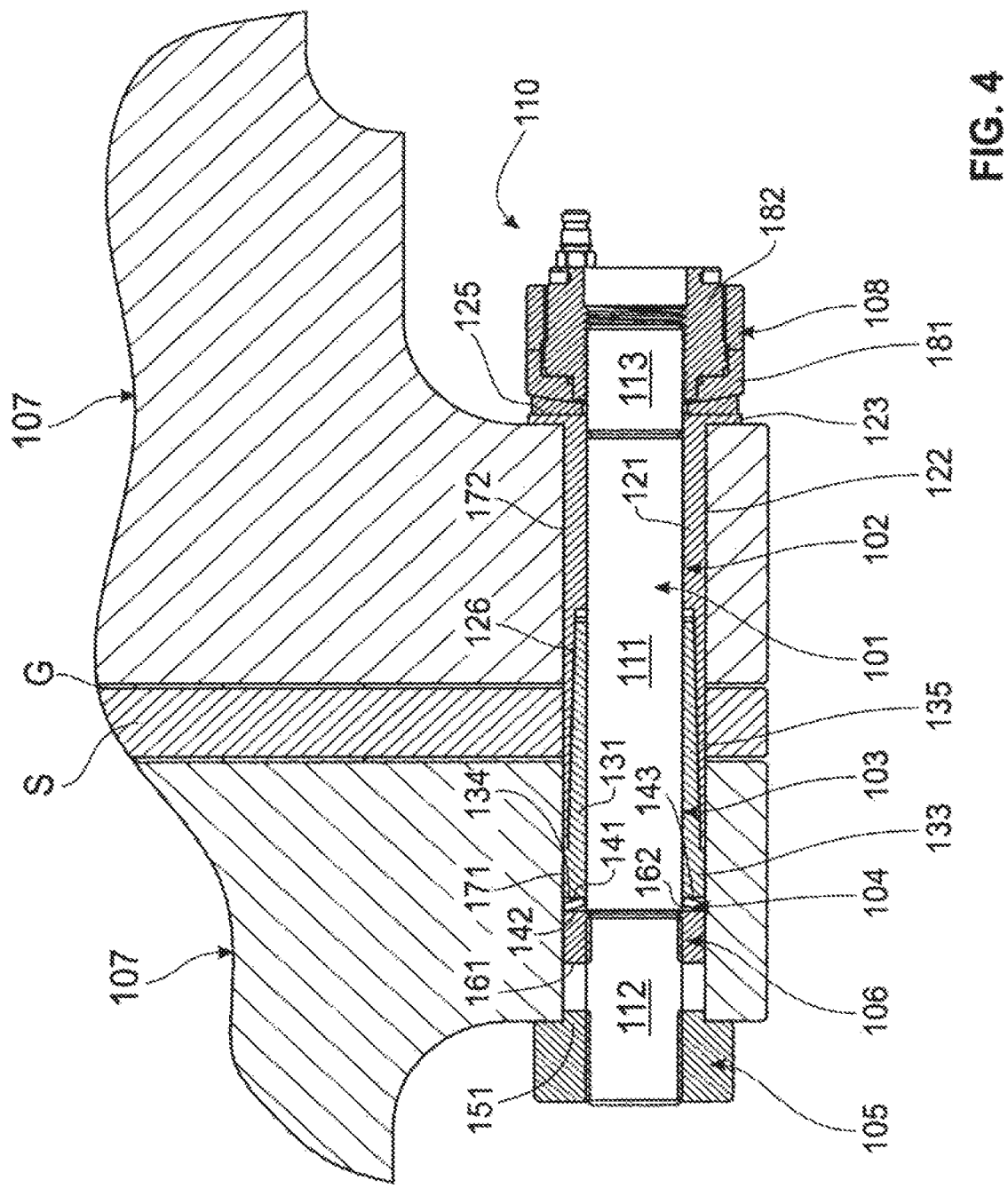
FIG. 4 is a sectional side elevational view of a coupling assembly between two machine components, with a coupling bolt of the second embodiment prior to the application of the tensional load to the bolt shank.

FIG. 4 illustrates a coupling assembly, of a second embodiment, between a pair of machine components 107 (with an interposed spacer S and gaskets or seals G) employing a coupling bolt 110 of the second embodiment of the present invention.

The shank 101, inner and outer sleeves 102, 103 and the head nut 105 are substantially as hereinbefore described, with reference numerals 1xx corresponding to reference numerals xx for the same items in FIGS. 1 to 3.

The drive piston 6 of the first embodiment is replaced by a drive member 106, in the form of a lock-nut screw-threadably engaged on the shank 101, with the outer face 161 of the drive member 106 spaced from the annular end portion 151 of the head nut 105.

The extrusion ring 4 of the first embodiment is replaced by a compression ring 104, of substantially frusto-conical shape e.g. in the form of a Belleville washer.

The divergent inner face 141 of the compression ring 104 engages the abutment face on the end of the inner sleeve 103, while the peripheral outer face 142 of the compression ring 104 engages the inner face 162 of the drive member 106.

As the hydraulic tensioner 108 applies a tensioning load, the divergent face 141 of the compression ring 104 engages the inner sleeve 103 to axially move the inner sleeve 103 relative to the outer sleeve 102 to cause the outer sleeve 102 to expand diametrically, while allowing the shank 101 to move within the inner sleeve 103 and for the shank 101 to be tensioned along its full length. The shank 101 can also pull the head nut 105 into engagement with the adjacent component 107. This enables the tensioning load to be evenly applied along the length of the shank 101. The divergent face 141 of the compression ring 104 may cause the inner sleeve 103 to expand diametrically into engagement with the outer sleeve 102.a When the tensioning load reaches a preset limit, when the outer and inner sleeves 102, 103 are fully engaged, the compression ring 104 will allow the shank 101 to move relative to the outer and inner sleeves 102, 103, and thereby relative to the two components 107, to ensure that the bolt 110 is evenly tensioned along its full length.

The tensioning load on the shank 101 can be maintained by the charged hydraulic jack 108; the lock nut may be engaged and the hydraulic jack 108 removed; and the components separated 107; in the same manner; as for the first embodiment of FIGS. 1 to 3.

Unlike the extrusion ring 4, the compression ring 104 may be reused, provided its mechanical limits have not been exceeded.

While only a single Belleville washer has been illustrated as the compression ring 104, two or more such Belleville washers (or the like) may be provided to provide greater axial movement of the bolt shanks 1, 101 relative to the "locked up" sleeves 2, 3 and 102, 103.

In both embodiments, the "preset limit" will correspond to the force required to expand the outer sleeve 2, 102 into engagement with the components 7, 107; but other such limits e.g. distance of axial movement of the shank relative to the components, or to the outer sleeve.

The skilled addressee will appreciate that the present invention provides coupling bolts with advantages which include, but are not limited to:

a) The coupling bolts are simpler to manufacture and/or operate, and are more cost effective;

b) The coupling bolts provide bolts of a "one pull" bolt design which enables the sleeve setting and bolt tensioning in a single action; and c) The bolts can be more easily removed when the tension is released.

Various changes and modifications may be made to the embodiments described and illustrated without departing from the present invention.

The invention claimed is:

1. A high-capacity radial fit coupling bolt assembly, or high-capacity expanding sleeve bolt assembly, to secure at least two components together, the assembly including:
   a shank having a substantially cylindrical central portion intermediate first and second end portions;
   respective inner and outer sleeves surrounding at least a section of the central portion of the shank, the inner and outer sleeves having complimentary respective outer and inner tapered engagement faces; and
   a compression ring interposed between a first end of the inner sleeve and a drive member at or adjacent the first end portion of the shank;
   so arranged that, as a tensioning load is increasingly applied to the second end portion of the shank, relative axial movement between the inner and outer sleeves will cause the outer sleeve to expand diametrically into engagement with the at least two components up to a preset limit, at which the compression ring will compress across a compressed distance and allow the shank to move across the compressed distance relative to the inner and outer sleeves and to the at least two components.

2. The assembly of claim 1, wherein:
as the tensioning load is initially applied to the second end of the shank, the compression ring will axially move the inner sleeve relative to the outer sleeve to expand the outer sleeve diametrically, while allowing the shank to move relative to the inner sleeve and thereby allow the tensioning load to be applied along the full length of the shank.

3. The assembly of claim 1, wherein:
the first end portion is formed with an integral head flange; or is screw-threaded to receive a head nut; the head flange or head nut being engageable with an abutment face on an end of one of the components.

4. The assembly of claim 3, wherein:
the head flange or head nut has an annular ring portion which extends into a first annular cavity, defined by a bolt hole in the one component and the first end portion of the shank, to optionally engage an outer annular face of the drive member, the inner face of the drive member engaging the compression ring.

5. The assembly of claim 3, wherein:
the drive member is a nut screw-threadably engaged on the shank, with an outer annular face of the drive member spaced from the annular ring portion of the head flange or head nut, the inner face of the drive member engaging the compression ring.

6. The assembly of claim 1, wherein:
the second end portion of the shank is screw-threaded, or otherwise profiled, to be releasably engaged h a tensioning apparatus, where the tensioning apparatus, or a tensioning nut on the second end portion, is engageable with an outer annular end face of the outer sleeve.

7. The assembly of claim 1, wherein:
the outer sleeve has a peripheral flange, forming the annular outer face, with an annular inner face for engaging a second component of the at least two components.

8. The assembly of claim 1, wherein:
the inner sleeve has a body with a cylindrical bore for slidable movement on the central portion of the shank; and
whereby in use a peripheral flange at a first end of the body is slidably received within a bolt hole in a first component of the at least two components and provides an annular abutment face at the one end engaged by the compression ring.

9. The assembly of claim 1; wherein:
the compression ring is a frusto-conical spring washer or Belleville spring washer, with a divergent inner face engaging the one end of the inner sleeve and an outer peripheral face engaging the inner face of the drive member.

10. The assembly of claim 1, wherein:
the outer tapered engagement face of the inner sleeve, and the inner tapered engagement face of the outer sleeve, is inclined at an angle of inclination relative to the longitudinal axis of the bolt assembly; where the angle of inclination is less than 10°; or less than 7.5'; or in the range of 0.5°-5°.

11. The assembly of claim 1, wherein:
the inner and outer sleeves will be manufactured from metals or alloys, with at least the outer sleeve having a wall thickness that enables the outer sleeve to expand diametrically sufficiently to fill the working clearance between the outer sleeve and the set of aligned bolt holes in the at least two components, enabling the bolt assembly to be inserted therein before tensioning, with a working clearance not exceeding 0.5 mm, or not exceeding 0.3 mm.

12. The assembly of claim 1, wherein:
grease, graphite, or other suitable lubricant, is applied to at least one of the tapered engagement faces before the bolt assembly is assembled, to assist the relative axial movement between the inner and outer sleeves as the bolt assembly is both tensioned and released.

13. The assembly of claim 1, wherein:
the shank and the drive piston are manufactured from high-tensile steel; and the compression ring is manufactured from spring steel.

14. The assembly of claim 1, wherein:
the outer sleeve has a body with a cylindrical outer face; wherein in use the body is slidably received in a bolt hole of a second component of the at least two components.

15. A method of securing at least two components together, the components having at least one set of aligned holt-holes, including the steps of:
   (a) inserting a high-capacity radial fit coupling, bolt assembly, as claimed in claim 1, into one set of the aligned bolt holes, with the head flange or head nut having an inner face spaced a small distance from an end face of a first of the components and an annular end portion on tithe head flange or head nut received in the bolt hole of the first component;

(b) applying, a tensioning load to the second end portion of the shank to axial draw the inner sleeve into the outer sleeve; wherein:

(c) the engagement between the outer tapered engagement face on the inner sleeve with the inner tapered engagement face of the outer sleeves causes the cylindrical outer face of the outer sleeve to expand diametrically into engagement with the one set of bolt holes in the components; and (d) as the tensioning load is further increased above a preset limit, the compression ring will compress across a compressed distance and allow the shank to move across the compressed distance relative to the inner and outer sleeves and to the at least components.

16. The method of claim 15, wherein:

during step (b), the compression ring will move the inner sleeve relative to the outer sleeve to expand the outer sleeve diametrically, while allowing the shank to move relative to the inner sleeve and thereby allowing the tensioning load to be applied along the full length of the shank to secure the at least two components together.

17. The method of claim 15, wherein:

after step (d), in a further step (e), a tensioning nut is engaged with screw-threads on the second end portion of the shank and is rotatably moved there-along into tensioned engagement with a second of the components, before release of the tensioning apparatus from the second end portion of the shank, the tensioning nut being received on the second end portion of the shank inwardly of the connection between the second end portion of the shank and the tensioning apparatus.

18. The method of claim 15, wherein:

after step (d), in a further step (e), a hydraulic nut, which operates as the tensioning apparatus, and which engages the second of the components, is isolated from a source of hydraulic fluid when the desired expansion of the outer sleeve and/or tension within the shank is achieved.

* * * * *